United States Patent
Jones et al.

(10) Patent No.: US 10,515,259 B2
(45) Date of Patent: Dec. 24, 2019

(54) METHOD AND SYSTEM FOR DETERMINING 3D OBJECT POSES AND LANDMARK POINTS USING SURFACE PATCHES

(71) Applicant: Mitsubishi Electric Research Laboratories, Inc., Cambridge, MA (US)

(72) Inventors: Michael J Jones, Belmont, MA (US); Tim Marks, Newton, MA (US); Chavdar Papazov, Munich (DE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/632,466

(22) Filed: Feb. 26, 2015

(65) Prior Publication Data
US 2016/0253807 A1    Sep. 1, 2016

(51) Int. Cl.
| | | |
|---|---|---|
| *G06K 9/00* | (2006.01) | |
| *G06T 7/73* | (2017.01) | |
| *G06K 9/46* | (2006.01) | |
| *G06K 9/62* | (2006.01) | |

(52) U.S. Cl.
CPC ..... *G06K 9/00221* (2013.01); *G06K 9/00248* (2013.01); *G06K 9/4628* (2013.01); *G06K 9/6271* (2013.01); *G06T 7/75* (2017.01); *G06T 2207/10028* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 5,995,639 A | * | 11/1999 | Kado ................. | G06K 9/00255 382/118 |
| 7,689,043 B2 | * | 3/2010 | Austin ............... | G06K 9/00221 382/118 |
| 7,844,105 B2 | | 11/2010 | Pfister et al. | |

(Continued)

OTHER PUBLICATIONS

E Seeman, K. Nickel, and R. Stiefelhagen. "Head pose estimation using stereo vision for human-robot interaction". In IEEE International Conference on Automatic Face and Gesture Recognition, 2004.

(Continued)

*Primary Examiner* — Fred H Hu
(74) *Attorney, Agent, or Firm* — Gennadiy Vinokur; Hironori Tsukamoto; James McAleenan

(57) ABSTRACT

A method and system determine a three-dimensional (3D) pose of an object and 3D locations of landmark points of the object by first obtaining a 3D point cloud of the object. 3D surface patches are extracted from the 3D point cloud, and a parametric model is fitted to each 3D surface patch to determine a set of descriptors. A set of correspondences between the set of descriptors and a set of descriptors of patches extracted from 3D point clouds of objects from the same object class with known 3D poses and known 3D locations of landmark points is determined. Then, the 3D pose of the object and 3D locations of the landmark points of the object are estimated from the set of correspondences.

14 Claims, 5 Drawing Sheets

(56) References Cited

U.S. PATENT DOCUMENTS

| | | | | |
|---|---|---|---|---|
| 8,582,867 | B2* | 11/2013 | Litvak | G06K 9/00201 |
| | | | | 382/154 |
| 8,755,630 | B2* | 6/2014 | Hwang | G06K 9/00208 |
| | | | | 382/276 |
| 8,824,781 | B2 | 9/2014 | Litvak | |
| 8,908,913 | B2* | 12/2014 | Taguchi | G06T 7/521 |
| | | | | 382/103 |
| 9,098,754 | B1* | 8/2015 | Stout | G06K 9/00805 |
| 9,524,582 | B2* | 12/2016 | Ma | G06T 17/20 |
| 2015/0339849 | A1* | 11/2015 | Iwamoto | G06T 17/10 |
| | | | | 345/420 |

OTHER PUBLICATIONS

M. Breitenstein, D. Kuettel, T. Weise, and L. V. Gool. "Real-time face pose estimation from single range images". In IEEE International Conference on Computer Vision and Pattern Recognition, 2008.

G. Fanelli, M. Dantone, J. Gall, A. Fossati, and L. V. Gool. "Random forests for real time 3d face analysis". Int. J. of Computer Vision, 101:437-458, 2013.

G. Fanelli, J. Gall, and L. V. Gool. "Real time head pose estimation with random regression forests". In IEEE International Conference on Computer Vision and Pattern Recognition, 2011.

G. Fanelli, T. Weise, J. Gall, and L. V. Gool. "Real time head pose estimation from consumer depth cameras". In Proc. of the German Assoc. for Pattern Rec. (DAGM), 2011.

T. Baltrusaitis, P. Robinson, and L.-P. Morency. "3d constrained local model for rigid and non-rigid facial tracking". In IEEE International Conference on Computer Vision and Pattern Recognition, 2012.

P. Padeleris, X. Zabulis, and A. Argyros. "Head pose estimation on depth data based on particle swarm optimization". In CVPR Workshop on Human Activity Understanding from 3D Data, 2012.

Muja et al., "Scalable Nearest Neighbor Algorithms for High Dimensional Data," IEEE Transactions on Pattern Analysis and Machine Intelligence, vol. 36, 2014.

* cited by examiner

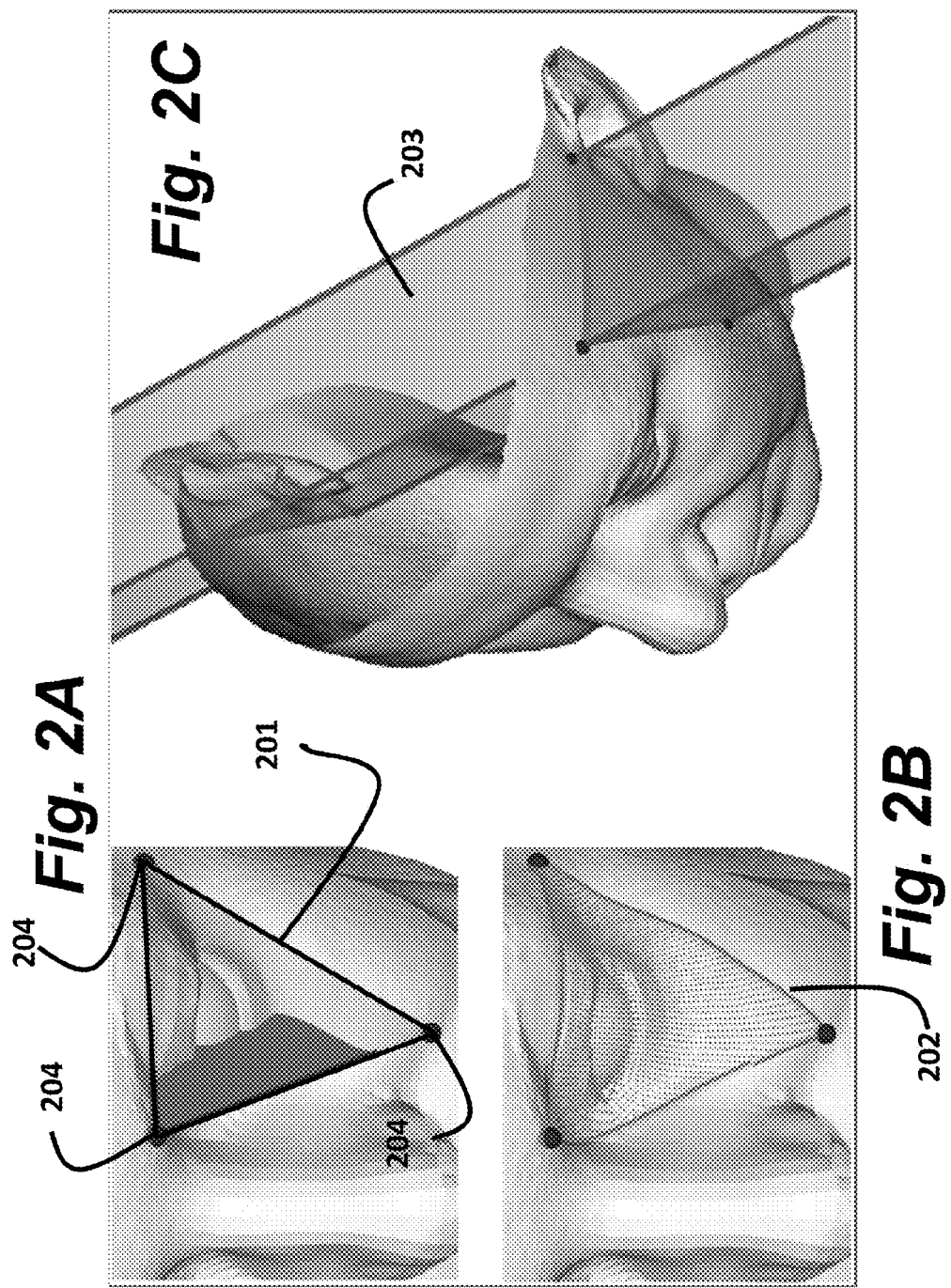

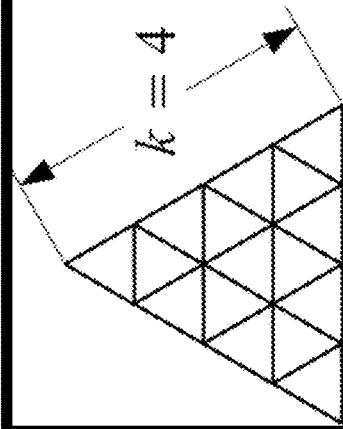
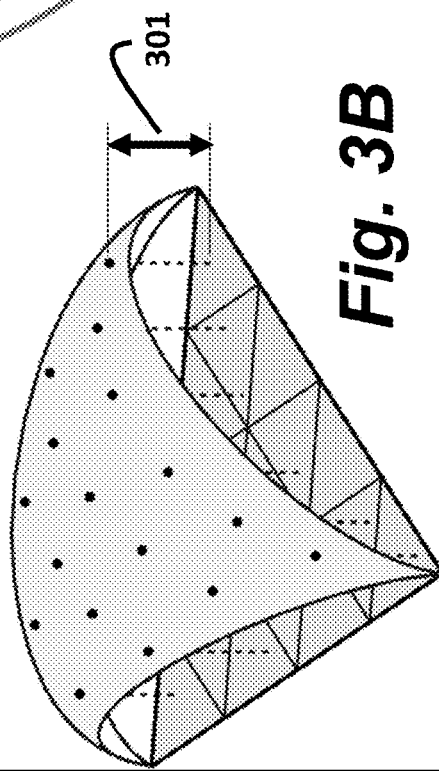
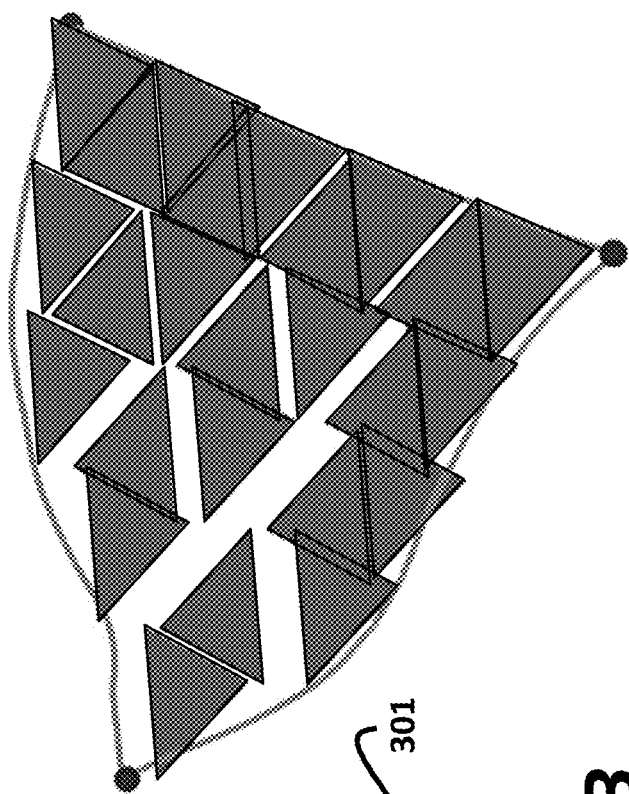
Fig. 3A
Fig. 3B
Fig. 3C

METHOD AND SYSTEM FOR DETERMINING 3D OBJECT POSES AND LANDMARK POINTS USING SURFACE PATCHES

FIELD OF THE INVENTION

This invention is generally related to computer vision, particularly to determining the 3D pose of objects and 3D locations of landmark points of objects, and more particularly to determining 3D head poses and 3D locations of facial landmarks.

BACKGROUND OF THE INVENTION

A number of computer vision application require the automatic determination of the three-dimensional (3D) pose (3D rotation angles and 3D translation) of an object, as well as the 3D locations of landmark points on the object, from a 3D point cloud. In particular, some applications require the 3D pose of a human head, as well as the 3D locations of facial landmarks, such as centroids of the eyes, from a 3D point cloud. The 3D point cloud is typically constructed from a depth image acquired by a depth sensor, such as a Microsoft Kinect™, a Creative Senz3D™ sensor, or a stereo camera. The 3D point cloud can also be generated synthetically using a 3D model of the object, or the 3D point cloud can be acquired directly using a 3D scanner such as a Cyberware™ scanner.

Automatically determining the head pose and facial landmark locations is important for face recognition systems, human-computer interfaces, and augmented reality systems, to name but a few applications. In face recognition systems, for example, one of the impediments to high accuracy is variations in the pose of the head. By accurately determining the pose, computer graphics techniques can be used to re-render the face in a frontal pose and thus largely eliminate the variations due to the pose.

As another example, an augmented reality system for cars that uses the windshield as a head-up display needs to precisely determine the 3D position of the driver's eyes in order to overlay information on the head-up display properly, so that the information is properly aligned with objects in the world that are visible through the windshield.

There are a number of prior-art solutions to the problem of head pose and facial landmark estimation. Many solutions use 2D images acquired by a grayscale or color camera to infer the 3D pose and location, e.g., by optimizing the pose, shape, and lighting parameters of a 3D morphable model to obtain a 2D rendering that matches an input image as closely as possible.

Some prior-art methods for solving this problem use depth images (also known as depth maps), which are 2D images in which the value at each pixel represents a depth value, or color-plus-depth images in which each pixel has color values and a depth value. Note that sensors that capture color-plus-depth images are sometimes called RGB-D (red, green, blue, depth) sensors, and the images the sensors produce are sometimes called RGB-D images. Also note that monochrome-plus-depth images (e.g., grayscale plus depth) can be considered as a type of color-plus-depth image.

One method uses a stereo pair of images to determine depths and then detect the head using skin color. A 3-layer neural network estimates the pose given the scaled depth image of the head region, see Seeman et al., "Head pose estimation using stereo vision for human-robot interaction," IEEE International Conference on Automatic Face and Gesture Recognition, pp. 626-631, May 2004.

Another method uses a more accurate and faster system for head pose estimation that takes advantage of a low-noise depth image acquisition system and the speed of a graphics processing unit (GPU). First, candidate 3D nose positions are detected in a high-quality depth image. Then, the GPU is used to identify the best match between the input depth image and a number of stored depth images that were generated from an average head model located at each candidate nose position, see Breitenstein et al., "Real-time face pose estimation from single range images," IEEE International Conference on Computer Vision and Pattern Recognition, pp. 1-8, June 2008.

Other methods also use high quality 3D depth images as input. Those methods are based on random regression forests and learned mappings from a patch of the depth image to head pose angles or facial landmark locations. In follow-up work, a Kinect sensor is used, which provides significantly noisier data compared to the high-quality scans used in the previous work, see Fanelli et al., "Random forests for real time 3D face analysis," International Journal of Computer Vision, 101:437-458, 2013, Fanelli et al., "Real time head pose estimation with random regression forests," IEEE International Conference on Computer Vision and Pattern Recognition, 2011, and Fanelli et al., "Real time head pose estimation from consumer depth cameras," Proceedings of the German Association for Pattern Recognition (DAGM) Symposium, 2011.

One method estimates the pose using a Kinect sensor depth image by determining the 3D rotation of a template that best matches the input. However, that method requires an initial person-specific template in a known pose. This makes it impractical for many applications, see Padeleris et al. "Head pose estimation on depth data based on particle swarm optimization," CVPR Workshop on Human Activity Understanding from 3D Data, 2012.

U.S. Pat. Nos. 8,582,867 and 8,824,781 describe a method for human body pose estimation, in which the goal is to estimate the joint positions of the skeleton of a body. In that method, patches of a depth image are used to determine feature vectors, which are matched, using an approximate nearest neighbor algorithm, to a database of feature vectors from training patches with known displacements to the joint positions. Each nearest neighbor match is used to obtain displacements to joint locations, which are then used to derive estimates of the desired joint positions.

SUMMARY OF THE INVENTION

The embodiments of the invention provide a method and system for automatically determining a 3D pose of an object and 3D locations of landmark points on the object from a 3D point cloud, such as can be constructed from a depth image or from the depth information in a color-plus-depth image.

The method is not limited to a specific model or type of depth sensor, because training data can be generated from low-noise (or noise-free) 3D object models. In prior-art models that work with noisy sensors, the training data must be acquired with the same type of sensor as the test data, or else have reduced accuracy. Since the method can be trained using low-noise or zero-noise high-resolution models, it is independent of the test sensor used in any particular application. This makes the method more generally applicable and transferrable than existing methods.

From the 3D point cloud, the method extracts 3D surface patches. A parametric model is fit to each 3D surface patch.

The parameters used to fit the patch are used as a descriptor of the patch, in the form of a feature vector. An approximate nearest neighbor search is then used to determine a set of correspondences between the descriptor of the patch extracted from the 3D point cloud and descriptors of similar surface patches that were extracted from training data. The training surface patches are extracted from point clouds of objects with known poses and known locations of object landmark points.

Each correspondence yields an estimate of the pose of the object, which includes the 3D rotation and 3D translation, and the 3D locations of object landmark points. Although each individual estimate can be noisy, the set of all correspondences from all of the 3D surface patches yields an accurate estimate of the 3D pose and the 3D locations of the landmark points.

In the preferred embodiments, the objects are human heads, and the landmark points are facial landmarks such as the tip of the nose, the centers of the eyes, and the corners of the eyes.

In the preferred embodiments, the patches are triangular surface patches (TSPs), based on equilateral base triangles whose vertices are extracted from the 3D point cloud representing the head. In some embodiments, the parametric model used to fit each patch is a triangular Bezier surface. In other embodiments, the parametric model fitted to each triangular patch is a sub-triangle parametric model. Other embodiments use other parametric models of the surface above and below the base triangle.

Prior-art methods typically use 2D patches of a depth image, rather than 3D patches of the 3D surface represented by a 3D point cloud. Those methods do not fit a parametric surface to a local region of the point cloud. Those descriptors are based on the points contained in a 2D patch of the depth image. Thus, their descriptors are pose-specific in that the training set must contain patches extracted from depth images of heads in similar poses as the input test image.

In contrast, the descriptors used by the embodiments of the invention are not pose-specific, and the training set of 3D point clouds do not necessarily represent any particular head pose.

BRIEF DESCRIPTION OF THE DRAWING

FIG. 2A is a schematic of an equilateral triangle used by embodiments of the invention;

FIG. 2B is a schematic of 3D triangular surface patch (TSP) according to embodiments of the invention;

FIG. 2C is a schematic of a set of points within an infinite-length triangular prism according to embodiments of the invention;

FIGS. 3A-3C are schematics of a first parametric model, called a Sub-triangle Parametric Model, according to embodiments of the invention;

DETAILED DESCRIPTION OF THE PREFERRED EMBODIMENTS

System and Method Overview

Figure 1:
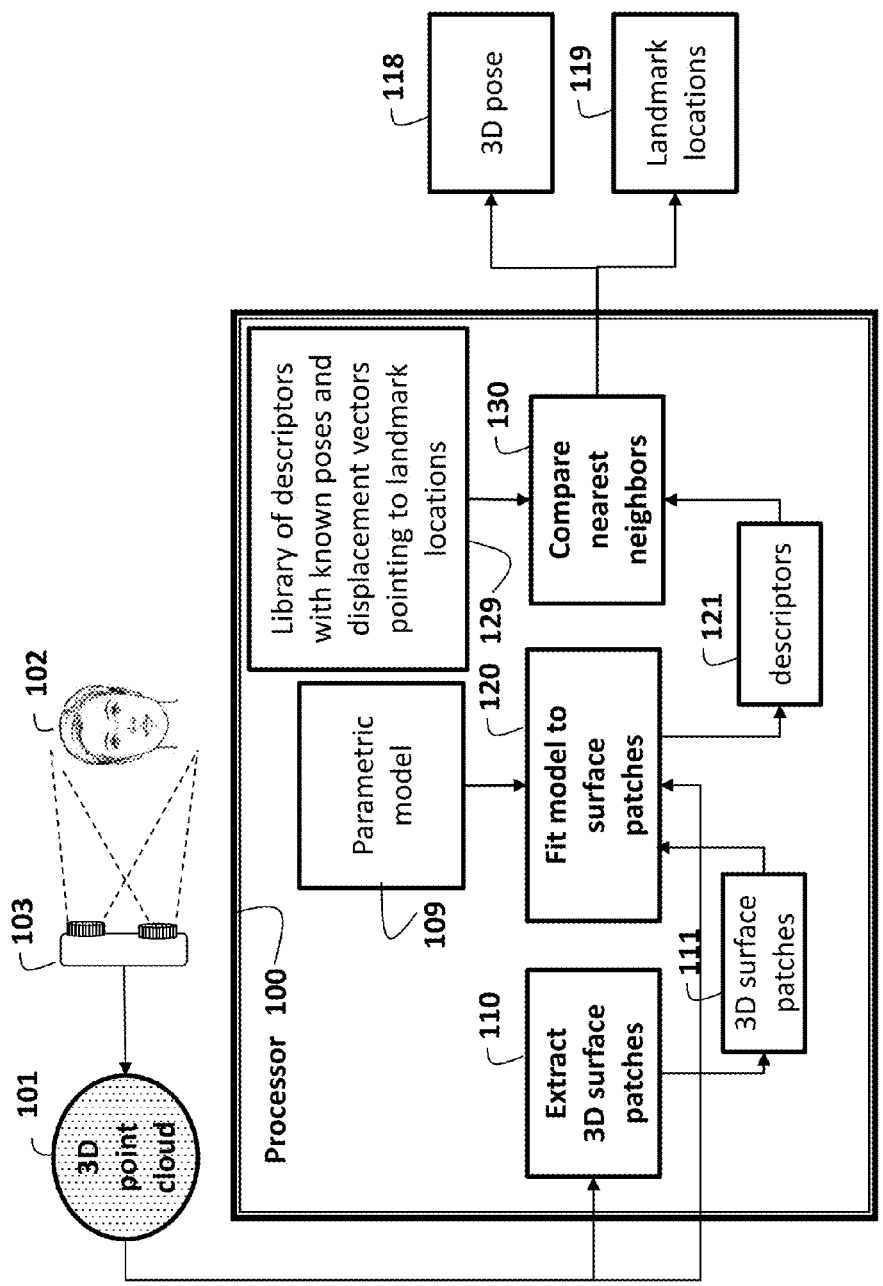
FIG. 1 is a flow diagram of a method and system for determining a 3D pose and 3D locations of facial landmarks of a head from a 3D point cloud according to embodiments of the invention.

As shown in FIG. 1, embodiments of the invention provide a method and system for automatically determining a 3D pose 118 and 3D locations 119 of, e.g., facial landmarks of a head 102. A 3D point cloud 101 is obtained. The means for obtaining can be, e.g., by computing the 3D point cloud from a depth image acquired by a depth sensor 103. From the 3D point cloud, the method extracts 110 3D surface patches 111. A parametric model 109 is fitted 120 to each 3D surface patch. Parameters used to fit the surface patch are used as a descriptor for the patch, e.g., in the form of a feature vector. The information that has been extracted from the observed 3D point cloud is thus contained in a set of descriptors 121 of all of the extracted surface patches 111. An approximate nearest neighbor algorithm is used to determine a set of correspondences between the set of descriptors of the patches extracted from the 3D point cloud and descriptors of similar surface patches that were previously extracted from training data and stored in a library 129. The training surface patches are extracted from point clouds of heads with known poses and known locations of facial landmarks. In a preferred embodiment, these point clouds are obtained from randomly generated synthetic 3D head models.

It is understood that the method can also be applied to objects other than heads, as long as the objects represented by the 3D point clouds are in the same object class, e.g., the object class could be heads, vehicles, robots, etc.

Each correspondence yields an estimate of the 3D head pose 118, which includes the 3D rotation and 3D translation, and the estimated 3D locations 119 of facial landmarks. Although each individual estimate can be noisy, the set of all correspondences from all of the 3D surface patches extracted from the point cloud yields accurate estimates of the 3D head pose and 3D facial landmark locations.

The steps can be performed in a processor 100 connected to memory (for storing the 3D point cloud and the library 129) and input/output interfaces (connected to, e.g., the sensor 102 by buses as known in the art).

The input to the method is the 3D point cloud that represents a real-world object (e.g., a head), and the output of the method is a 3D pose and 3D locations of landmarks of the object. The pose and landmarks can be sent to, e.g., a display device, or another application further processing.

Triangular Surface Patch

Preferred embodiments of the invention use 3D triangular surface patches (TSPs).

As shown in FIG. 2A, each 3D TSP 111 is extracted from the 3D point cloud by first defining an equilateral triangle T 201 with a pre-specified side length whose vertices 204 are approximately on a surface represented by the 3D point cloud. Vertices within a threshold distance, such as 3 mm, from the surface of the 3D point cloud are allowed. We refer to this triangle T as the base triangle for the TSP. A variety of methods may be used to select the surface triangle T. In the preferred embodiment, we use a method that selects equilateral triangles of a pre-specified size from random locations and random orientations on a surface defined by the point cloud.

Equilateral Triangle Sampling

Fast equilateral triangle sampling from 3D point clouds can be used in both the training phase and the testing phase of our method. The problem can be formulated as follows. Given a point cloud $S \subset \mathbb{R}^3$, and two positive numbers d and l, generate an equilateral triangle $T=(q_0, q_1, q_2)$ with side length l such that the distance between each $q_i$ and the closest point from S is smaller than d.

Obviously, for certain point clouds and values for d and l, no such triangle exists. However, our point clouds are dense enough and both d and l have appropriate values, e.g., d=3 mm.

First, we sample a seed point p uniformly from the points of S and compute a normal direction n at p.

If S is the set of vertices of a mesh, the seed point is sampled uniformly from the interior of a randomly selected mesh triangle, where the probability of selecting a mesh triangle is proportional to its area. In this case, n is simply the normal of the mesh triangle from which p was sampled.

If S is a point cloud reconstructed from a depth image (in which each point corresponds to a single pixel in the depth map), then the seed point p may be sampled uniformly from the set of points in the point cloud. In this case, we compute n as the average of the normals of the planes passing through p and pairs of its 4-connected neighbors. Here, the neighborhood structure of S is the one imposed by the rectangular grid of the depth image.

Now, that we have a seed point p and a normal n, we generate an equilateral triangle T with side length l and transform it such that it lies in the plane defined by p and n and its centroid coincides with p. This defines T up to a rotation about n by an angle, which we select randomly from the interval $[0, 2\pi)$.

This procedure yields a randomly generated triangle that meets all requirements except being close enough to the point cloud. To achieve this, we transform T to using an iterative closest point (ICP) algorithm. In each iteration of ICP, we first compute, for every triangle vertex $q_i$, the closest point from S, denoted $q_i'$, then rigidly transform T such that the sum over i of the squared distances between $q_i'$ and the transformed $q_i$ is minimized.

Initially, T is not too far away from S, so ICP typically converges within a small number of iterations (e.g., 3 iterations). After that, we test whether each triangle vertex is indeed within a distance d from S. If not, the triangle gets rejected and the whole procedure is repeated. This sampling method generates triangles that cover the input point cloud approximately uniformly. Note that if the depth image is too noisy and the normal n cannot be reliably computed, we can simply set n to be the negative of the depth sensor viewing direction (usually [0, 0, −1]). In this case, the initial triangle is not as well aligned to the point cloud, and ICP is likely to need additional iterations to converge.

Given such an equilateral triangle T, a 3D TSP P 202 includes those points from the point cloud that are located on the surface of the face above or below the equilateral triangle, as shown in FIG. 2B. In other words, the 3D TSP is the set of points from the point cloud contained within an infinitely tall triangular prism 203 with base T.

Having a prism of infinite extent can lead to a TSP containing points close to the base triangle as well as points belonging to unrelated parts of the head, as shown in FIG. 2C. To avoid this, we only consider points to be in the TSP when the points are in the interior of the prism and inside of a circumsphere that is centered at a centroid of the base triangle and passes through the base triangle's vertices.

For general surface geometries, the circumsphere of a base triangle can cut off surface parts that are too much above or below the base triangle. However, this does not happen in practice because faces have limited local height variation, and we use a triangle with side lengths that are sufficiently large.

Given the base triangle T and the corresponding triangular surface patch P, we determine a compact descriptor that represents the TSP. We do so by fitting a parametric model to the 3D surface patch. Then, we use the parameters of the model as the descriptor of the surface patch. There are multiple types of parametric model that can be fitted to the TSP to provide the descriptor for the TSP, such as a sub-triangle parametric model or a Bezier triangle parametric model.

Sub-Triangle Parametric Model

In a first parametric model as shown in FIG. 3A, the base triangle is partitioned into $k^2$ equilateral sub-triangles (e.g., k=4). If the points in the TSP P are projected perpendicularly onto the base triangle, then each point in P is projected into one of the sub-triangles. We say that the point belongs to the sub-triangle, or equivalently, the sub-triangle contains the point. Each point in P has some (positive or negative) height 301 from the base triangle, as shown in FIG. 3B.

The descriptor of each sub-triangle is the mean height of the points contained in the sub-triangle. Using the average height of all points within the sub-triangle makes the descriptor robust to noise in the point cloud and to variations in the data resolution. In the sub-triangle parametric model, the descriptor of the TSP is a vector v that is a concatenation of the descriptors of all of the sub-triangles. The TSP descriptor can be interpreted as the set of parameters of a piecewise-constant triangular surface patch, defined in the coordinate system of the base triangle, that approximates the TSP, as shown in FIG. 3C. The part of the surface patch that is contained in the sub-triangle is approximated as a triangular sub-patch that is congruent to and parallel to the sub-triangle but is displaced from the sub-triangle, i.e., offset in a direction perpendicular to the base triangle, by the mean height of the points contained in the sub-triangle.

Filling for Missing Data

A further challenge of real-world depth images is the presence of holes due to limitations in the depth sensor and due to self-occlusions in the head. This can lead to TSPs with empty sub-triangles and undefined descriptors.

To handle this, we fill in the missing data by propagating the height information of full (i.e., populated) sub-triangles across the empty (i.e., unpopulated) sub-triangles, using an iterative procedure. During each iteration, each empty sub-triangle is populated by assigning the average height of its full neighboring sub-triangles. Sub-triangles that have no full neighbors remain unchanged during the current iteration. This process is repeated until all sub-triangles are populated. Finally, a fixed number of smoothing iterations, e.g., simple averaging of the values in the neighboring sub-triangles, are applied only to the newly populated sub-triangles without changing the original full sub-triangles. This leads to a smooth distribution of height information across any holes in the point cloud.

Bezier Triangle Parametric Model

Figure 5C:
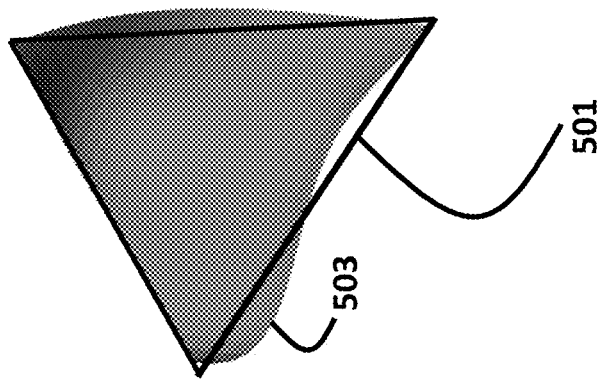
FIG. 5C is a schematic of a Bezier triangle that approximates the TSP according to embodiments of the invention.
Figure 5B:
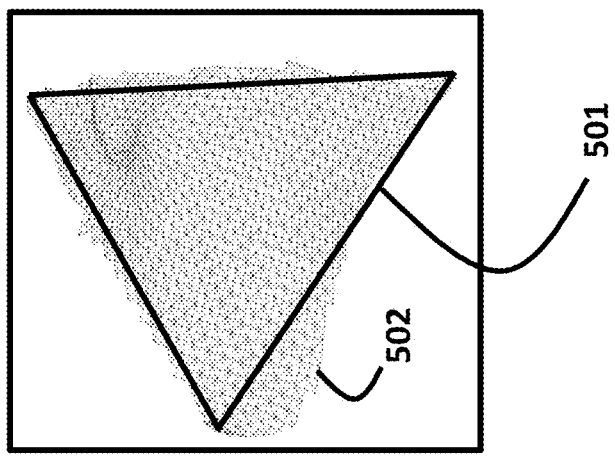
FIGS. 5A-5B are schematics of a triangular surface patch (TSP), defined over a base triangle, extracted from a point cloud derived from a 3D head model according to embodiments of the invention.
Figure 5A:
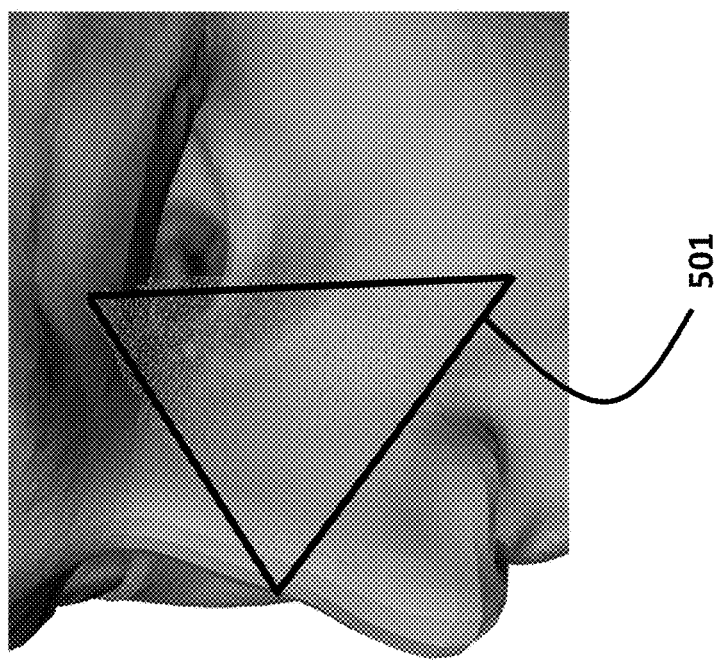

FIGS. 5A through 5C show an example of a second parametric model: a Bezier triangle defined over a base triangle 501 that was extracted from a 3D point cloud. In this example, the point cloud consists of the vertex locations of a high-resolution 3D mesh. The TSP 502 is approximated using a Bezier triangle 503. In this example, the Bezier triangle 503 is a smooth approximation of the TSP 502. The Bezier triangle is a surface defined by n control points, which are respectively associated with n regularly spaced points on the base triangle. For a general Bezier triangle, the parameters of the model are the 3D displacement of each control point from the position of the point on the base triangle, i.e., three parameters for each control point.

To simplify the model and reduce the number of parameters of the Bezier triangle, we restrict each control point to be displaced perpendicularly to the base triangle. Thus, for each control point, there is only one corresponding parameter: the height of the control point above or below the base triangle. The number of control points n can vary depending on the desired fit of the Bezier triangle to the set of 3D points in TSP P. Using this model, the TSP descriptor is simply the vector of length n containing the heights (positive or negative) of all of the control points.

Advantages of Triangular Surface Patches and TSP Descriptors

A first important strength of our approach is that triangular surface patches are defined over a 3D point cloud, rather than over a depth image. This makes the patches more invariant when subject to viewpoint changes. Prior-art methods that compute features directly on patches of depth images require that the training set contain depth maps that are captured from similar viewpoints to the test depth map, because just like a regular photographic image, a depth image can vary greatly with the viewpoint changes. In contrast to depth images, a 3D point cloud maintains its basic shape across a wider range of viewpoint changes. Hence, it works quite well even though the training data are not associated with particular viewpoints.

A second strength of our approach is that our TSP descriptors are robust to variations in local sampling density, which further improves robustness to viewpoint changes and also provides robustness to partial occlusions and other causes of missing data. When the 3D point cloud is obtained from a depth image (e.g., acquired using a depth sensor), the density of points varies based on the viewpoint from which the depth image was acquired. For example, areas on the object surface where the surface normal points directly toward the depth sensor that acquires the depth image are represented densely in the point cloud. However, areas on the object surface whose normal is oriented almost perpendicular to the axis of the depth sensor (i.e., almost 90 degrees away from the direction from the depth sensor to the object) are represented by very few surface points in the point cloud. Our parametric models, the sub-triangle parametric model and the Bezier triangle parametric model, approximate the 3D shape of the surfaces represented by the point cloud in ways that are not strongly affected by variations in sampling density. This is in contrast to 3D descriptors of point clouds that are based on histograms, which are heavily affected by variations in sampling density.

Training

Figure 4B:
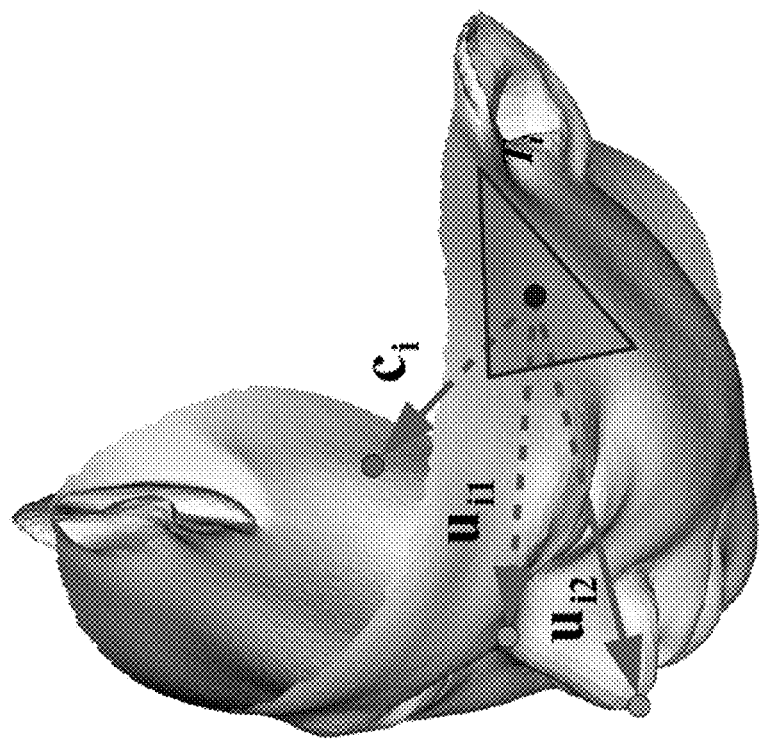
FIG. 4B is a schematic of a base triangle and associated data used for training according to embodiments of the invention.
Figure 4A:
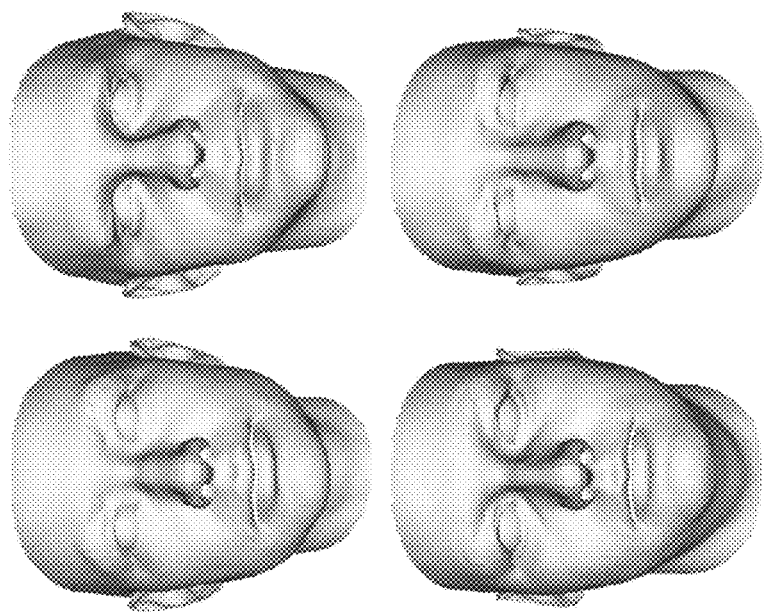
FIG. 4A is a schematic of exemplar 3D heads used for training according to embodiments of the invention.

In the preferred embodiment, the training is performed on high-resolution meshes of 3D heads such as the examples shown in FIG. 4A. In some embodiments, each mesh is obtained using high-resolution 3D scans of a single subject. In the preferred embodiment, each mesh is generated by randomly varying the parameters of a parametric 3D head model. The parametric 3D head model may itself be derived from high-resolution 3D scans of multiple subjects. The point cloud for each model can be defined from the mesh in multiple ways: e.g., as the vertices of the mesh, or the centers of the polygons in the mesh, or as points randomly sampled from the mesh. From each mesh in the training set, we randomly sample n equilateral base triangles $T_1, \ldots, T_n$, e.g., n=10,000, which densely covers the mesh in overlapping base triangles. Next, we determine the TSP corresponding to each sampled base triangle $T_i$ and determine the associated descriptor $v_i$.

Furthermore, we associate with each base triangle $T_i$ the vectors from the centroid of $T_i$ to certain points of interest, which in the preferred embodiment are the model centroid and certain facial landmarks of that model, e.g., top of the nose, tip of the nose, and eye centroids. These vectors are used during testing to determine the locations of the facial landmarks.

Library

Thus, for each training model, we generate and store n samples $\mathcal{T}_i, \ldots, \mathcal{T}_n$, each one of which includes the base triangle $T_i$ along with associated data $$\mathcal{T}_i = \{T_i, v_i, c_i, u_{i1}, \ldots, u_{iq}\},$$

where $v_i$ is the TSP descriptor, $c_i$ is the vector from the centroid of $T_i$ to the model centroid, $u_{ik}$ is the vector from the centroid of $T_i$ to the position of the $k^{th}$ facial landmark as shown in FIG. 4B, and q is the number of landmarks in each model.

All samples from all of the training face models are stored in the library 129. The library is organized in a way that allows rapid retrieval of samples whose TSP descriptors are most similar to the descriptor of a given query sample. Similarities between descriptors are measured by Euclidean distances. To obtain nearest neighbors of TSP descriptors efficiently, an approximate nearest neighbor algorithm can be used, see e.g., Muja et al., "Scalable Nearest Neighbor Algorithms for High Dimensional Data," IEEE Transactions on Pattern Analysis and Machine Intelligence, Vol. 36, 2014.

The TSP descriptors $v_i$ are saved as row vectors in a large matrix, and the other components of $\mathcal{T}_i$ are stored in corresponding order in an array. Given a query descriptor for a sample from a test head, the approximate nearest neighbor algorithm operates on the matrix and provides the row indices of the TSP descriptors in the library that are approximately most similar to the query descriptor. Using these, we can retrieve from the array the corresponding base triangles and their associated facial landmark information.

Because the centroid $c_i$ of the face model and the facial landmark vectors $u_{i1}, \ldots, u_{iq}$ are all defined relative to the base triangle $T_i$, our model representation can be used to estimate pose and locations of facial landmarks for heads in arbitrary poses and, in particular, at arbitrary distances from the sensor 103.

Furthermore, because training is done on general 3D models (rather than using depth images obtained from a particular depth sensor at a particular distance from a subject), the same training results (e.g., the same library) may be used with a variety of sensors during testing. This is not the case for most prior-art methods, where the same sensor (or the same model of sensor) must be used for training and testing.

Testing

The testing is performed on a 3D point cloud S 101 of a head 102. In a preferred embodiment, the point cloud has been reconstructed from a depth image, e.g., obtained from a depth sensor 103 such as a Kinect sensor. The head pose (which consists of 3D head orientation and 3D head centroid location) and the locations of facial landmarks are determined as follows.

Voting

Consider an equilateral base triangle $T_i'$ that has been sampled from the point cloud S. We determine the corresponding TSP and the descriptor, $v_i'$. Next, $v_i'$ is used as a key to retrieve the most similar descriptor, $v_i$, from the library. Recall that $v_i$ is associated with the library sample $\mathcal{T}_i$, which also contains: the base triangle $T_i$; the vector $c_i$, which gives the location of the centroid of the corresponding training head relative to triangle $T_i$, and $u_{i1}, u_{iq}$, vectors which give locations of each of the q facial landmarks relative to $T_i$.

We transform $c_i$ into the coordinate system of the point cloud S. This is accomplished by a rigid transformation whose translation is $u_i'$, and whose rotation matrix $R_i$ is found as follows: Translate $T_i$ and $T_i'$ to respectively obtain $\tilde{T}_i$ and $\tilde{T}_i'$ whose centroids are at the origin, then find $R_i$ that satisfies $R_i\tilde{T}_i=\tilde{T}_i'$. In this way, based on its match to the test triangle $T_i'$, model base triangle $T_i$ votes for: head orientation $R_i$, and head centroid location $t_i=u_i'+R_ic_i$, and $\hat{T}_i'$.

Because we are dealing with real-world data, the input point cloud can be corrupted by noise and can also represent non-head objects. Furthermore, heads to test may come from subjects that are not represented in the library. To handle these variations, we sample m query base triangles from the test head and retrieve for each query triangle the h training triangles whose descriptors are most similar to the descriptor of the query triangle. Each of these training triangles votes for a particular pose. We say that these h training triangles match the query triangle, and refer to the query triangle as the matching test triangle for the h training triangles.

This results in a total of mh rotation matrix votes for the head orientation, and mh positional votes for the centroid location. Note that these votes are in two different spaces. The rotational votes are in a group of rotation matrices SO(3), and the positional votes are in three-dimensional Euclidean space $\mathbb{R}^3$. Before the facial landmark locations are determined, we eliminate inconsistent votes using vote filtering.

Vote Filtering

During the training, the facial landmark locations are stored, similar to the model centroids, as vectors relative to the base triangle. Thus, voting for facial landmark locations can be performed in the same way that voting for the model centroid is performed. This leads to multiple voting spaces: SO(3) for the head orientation, and a separate voting space $\mathbb{R}^3$ for the head centroid and each of the landmark locations. A cluster center in each voting space can be detected independently.

The voting can lead to inconsistent cluster centers, i.e., to misplaced facial landmarks whose relative locations are not physically possible for a real human face. Even though faces differ in a non-rigid manner across individuals, a particular head position and orientation put strong constraints on the possible locations of the nose, eyes, ears, etc. This is not taken into account by the clustering described above.

Joint Clustering

Therefore, we filter out inconsistent votes by performing joint clustering in the rotation and centroid voting spaces. The reason why we do not use facial landmark votes is the following. Tests with independent clustering in each space indicate that the rotation estimates are more stable than those of the facial landmarks, meaning that the landmark location estimates are wrong more often than the head orientation estimates.

To obtain the missing translational degrees of freedom of the head, we use the centroid votes. Note that the error of a facial landmark estimate increases with increasing distance between the base triangle and the landmark position. Because the model centroid roughly minimizes the average distance to all base triangles, the centroid is the most appropriate among all positional votes. The joint clustering works as follows.

Recall that each model base triangle $T_i$ votes for both a head orientation $R_i$, and a head centroid location $t_i$. We say that $R_i \in SO(3)$ and $t_i \in \mathbb{R}^3$ are the votes of $T_i$. To estimate the cluster center in both spaces jointly, we count the number of neighbors of $T_i$ in each space. For another base triangle $T_j$ to count as a neighbor of $T_i$, both the rotational vote $R_j$ and centroid votes $t_j$ of $T_j$ have to be within a predefined distance to the votes of $T_i$. That is, both conditions $d(R_i, R_j)<d_r$ and $\|t_i-t_j\|<d_t$ have to hold, where $d(R_i, R_j)$ is an appropriate distance function in SO(3). In a preferred embodiment, we use $d_r=15°$ and $d_t=25$ mm. Since the product of two rotation matrices is itself a rotation matrix, the product $R_i^T R_j$ is equivalent to a single rotation by an angle $\theta$ about some axis. Furthermore, the function $d_R(R_i,R_j)=|\theta|$ is a distance function in SO(3), known as the Riemannian distance, and we use this distance measure to test the condition described above. Furthermore, the Riemannian distance $|\theta|$ is related to the Frobenius distance $d_F(R_i,R_j)=\|R_i-R_j\|_F$, where $\|\cdot\|_F$ denotes the Frobenius norm of a matrix, by the relationship $$d_F(R_i, R_j) = 2\sqrt{2}\left|\sin\frac{\theta}{2}\right|.$$

Using this relationship enables us to evaluate the Riemannian distance condition $d_R(R_i,R_j)<d_r$ using the efficiently computed Frobenius norm.

We use the term winning base triangles to refer to the set of base triangles that are permitted to vote. The set of winning base triangles contains the base triangle with the most neighbors as well as all of the neighbors of that base triangle. We refer to the winning base triangles as $T_1, \ldots, T_N$, where N is the number of winning base triangles. Each winning base triangle $T_i$ has a matching test triangle $T_i'$, with centroid $\mu_i'$. As explained above, based on this match, $T_i$ votes for head orientation $R_i$ and head centroid location $t_i=\mu_i'+R_ic_i$. We estimate the head orientation as an average $\bar{R}$ of the winning base triangles' orientation votes $R_1, \ldots, R_N$.

The problem of computing the average rotation matrix $\bar{R}$ in SO(3) can be formulated as a minimization problem:

$$\bar{R} = \operatorname*{argmin}_{R \in SO(3)} \sum_{i=1}^{N} d^2(R_i, R),$$

where d is a distance function in SO(3). Unfortunately, this minimization cannot be solved in closed form for the Riemannian distance. In our case, however, the input matrices are close to each other because they all lie in the neighborhood of the same rotation matrix. In this case, solving the minimization for the Frobenius distance is a good approximation and can be done in closed form: $\bar{R}=WV^T$, where W and V are obtained by computing the singular value decomposition (SVD) of the arithmetic mean of the winning triangles' orientation votes: $W\Sigma V^T=$ $$\frac{1}{N}\sum_{i=1}^{N} R_i.$$

Next, we use the facial landmark vectors of the winning base triangles to estimate the positions of the facial landmarks on the test face. Let $\tilde{u}_k$ denote our estimate of the position of the $k^{th}$ landmark (say, the tip of the nose) of the test face in the coordinate system of the point cloud S. In one embodiment, we compute $\tilde{u}_k$ by $$\tilde{u}_k = \frac{1}{N} \sum_{i=1}^{N} (\mu'_i + R_i u_{ik}),$$

where $u_{ik}$ is a vector from the centroid of $T_i$ to the position of the $k^{th}$ facial landmark.

In an alternative embodiment, we modify the computation of $\tilde{u}_k$ by using the average rotation matrix $\overline{R}$ in place of every individual winning triangle's orientation vote $R_i$. In other words, we use the following alternate equation to compute $\tilde{u}_k$:

$$\tilde{u}_k = \frac{1}{N} \sum_{i=1}^{N} (\mu'_i + \overline{R} u_{ik}).$$

In either of these alternative embodiments, this procedure produces consistent facial landmark estimates, because all of the facial landmark vectors stem from base triangles that vote for similar head orientations and centroid locations.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a three-dimensional (3D) pose of an object and 3D locations of landmark points of the object, comprising steps of:
    obtaining a 3D point cloud of the object;
    sampling 3D surface patches from the 3D point cloud, each 3D surface patch includes a 3D center point, a 3D normal vector and 3D geometric surface, and each 3D surface patch is presented as a descriptor including parameters of a parametric model that fit to each 3D surface patch of the 3D point cloud, to obtain a set of descriptors;
    determining a set of correspondences between the set of descriptors and a set of training descriptors of patches extracted from training objects from the same object class as the obtained object with known 3D poses and known 3D locations of landmark points;
    determining for each correspondence from the set of correspondences a 3D rotation and a 3D translation, that map the 3D normal vector of the training 3D surface patch to the 3D normal vector of the sampled 3D surface patch, and using the 3D rotation and 3D translation to transform the training vectors pointing to the 3D locations of the landmark points on the training object to the landmark locations on the obtained 3D point cloud, to obtain a set of 3D rotations, 3D translations and 3D vectors pointing to the landmark points of the object; and
    estimating the 3D pose of the object, that includes a 3D rotation and a 3D translation, and 3D locations of the landmark points of the object from the estimates contained in the set of 3D rotations, 3D translations and 3D vectors pointing to the landmark points of the object, wherein the steps are performed in a processor connected to a memory storing the 3D point cloud.

2. The method of claim 1, wherein the object is a human head and the landmark points are facial landmarks.

3. The method of claim 1, wherein the 3D point cloud is obtained by computing a 3D point cloud from a depth image.

4. The method of claim 3, wherein the depth image is acquired by a depth sensor.

5. The method of claim 1, wherein the determining is performed using an approximate nearest neighbor algorithm.

6. The method of claim 1, wherein the 3D point cloud is generated synthetically.

7. The method of claim 1, wherein the 3D surface patches are triangular, and the parametric model is a sub-triangle parametric model.

8. The method of claim 1, wherein the 3D surface patches are selected from random locations and random orientations on a surface defined by the 3D point cloud.

9. The method of claim 7, further comprising:
    filling in holes in the parametric model using neighboring sub-triangles.

10. The method of claim 1, wherein the estimating is performed using a voting technique.

11. The method of claim 10, wherein inconsistent votes are filtered by performing joint clustering in rotation and centroid voting spaces.

12. The method of claim 10, wherein the results of the estimating are used by an augmented reality system for cars that uses a head-up display.

13. A system for determining a three-dimensional (3D) pose of an object and 3D locations of landmarks of the object, comprising:
    a memory having stored therein information about historical 3D training objects, including training descriptors representing 3D surface patches of training objects, 3D pose and 3D landmark point locations of the training objects; and
    a processor, connected to the memory, is configured to:
        access a 3D point cloud of the object;
        extract 3D surface patches from the 3D point cloud, each 3D surface patch includes a 3D center point, a 3D normal vector and 3D geometric surface, and each 3D surface patch is presented as a descriptor including parameters of a parametric model that fit to each 3D surface patch of the 3D point cloud, to obtain a set of descriptors, wherein the extracted 3D surface patches include a planar triangular shape and 3D points located above, below, or both, of a surface of the planar triangular shape;
        determine a set of correspondences between the set of descriptors and a set of training descriptors of patches extracted from training objects from the same object class as the accessed object with known 3D poses and known 3D locations of landmarks;
        determine for each correspondence from the set of correspondences a 3D rotation and a 3D translation, that map the 3D normal vector of the training 3D surface patch to the 3D normal vector of the sampled 3D surface patch, and using the 3D rotation and 3D translation to transform the training vectors pointing to the 3D locations of the landmark points on the training object to the landmark locations on the obtained 3D point cloud, to obtain a set of 3D rotations, 3D translations and 3D vectors pointing to the landmark points of the object; and estimate the 3D pose of the object, that includes a 3D rotation and a 3D translation, and 3D locations of the landmarks of the object from the estimates contained in the set of 3D rotations, 3D translations and 3D vectors pointing to the landmark points of the object.

14. A data processing system for determining a three-dimensional (3D) pose of an object and 3D locations of landmark points of the object, comprising:

a data storage memory having stored therein information about historical 3D training objects, including training descriptors representing 3D surface patches of training objects, 3D pose and 3D landmark point locations of the training objects;

at least one processor, coupled to input interfaces, output interfaces and the data storage memory, the at least one processor is configured to:

access a 3D point cloud of the object;

extract 3D surface patches from the 3D point cloud, each 3D surface patch includes a 3D center point, a 3D normal vector and 3D geometric surface, and each 3D surface patch is presented as a descriptor including parameters of a sub-triangle parametric model that fit to each 3D surface patch of the 3D point cloud, to obtain a set of descriptors, the sub-triangle parametric model includes a base triangle and a set of sub-triangles wherein the extracted 3D surface patches include a planar triangular shape and 3D points located above, below, or both, of a surface of the planar triangular shape;

compare each descriptor to a set of training descriptors of the training descriptors stored in the data storage memory, so as to be matched to a training descriptor from the set of training descriptors;

determine a set of correspondences between the set of descriptors and a set of training descriptors of patches extracted from training objects from the same object class as the accessed object with known 3D poses and known 3D locations of landmarks;

determine for each correspondence from the set of correspondences a 3D rotation and a 3D translation, that map the 3D normal vector of the training 3D surface patch to the 3D normal vector of the sampled 3D surface patch, and using the 3D rotation and 3D translation to transform the training vectors pointing to the 3D locations of the landmark points on the training object to the landmark locations on the obtained 3D point cloud, to obtain a set of 3D rotations, 3D translations and 3D vectors pointing to the landmark points of the object; and estimate the 3D pose of the object, that includes a 3D rotation and a 3D translation, and 3D locations of the landmark of the object from the estimates contained in the set of 3D rotations, 3D translations and 3D vectors pointing to the landmark points of the object.

* * * * *